(12) United States Patent
Suga et al.

(10) Patent No.: US 10,487,170 B2
(45) Date of Patent: Nov. 26, 2019

(54) POLYCONDENSATION PRODUCT CONTAINING PHENOLIC COPOLYMER AND DISPERSANT FOR HYDRAULIC COMPOSITION CONTAINING THE SAME

(71) Applicant: TOHO CHEMICAL INDUSTRY CO., LTD., Tokyo (JP)

(72) Inventors: Akira Suga, Sodegaura (JP); Katsutoshi Sato, Sodegaura (JP); Tomohisa Okada, Sodegaura (JP); Taro Tsushima, Sodegaura (JP)

(73) Assignee: TOHO CHEMICAL INDUSTRY CO., LTD., Tokyo (JP)

(*) Notice: Subject to any disclaimer, the term of this patent is extended or adjusted under 35 U.S.C. 154(b) by 116 days.

(21) Appl. No.: 15/750,452

(22) PCT Filed: Aug. 4, 2016

(86) PCT No.: PCT/JP2016/072963
§ 371 (c)(1),
(2) Date: Feb. 5, 2018

(87) PCT Pub. No.: WO2017/022831
PCT Pub. Date: Feb. 9, 2017

(65) Prior Publication Data
US 2018/0223028 A1  Aug. 9, 2018

(30) Foreign Application Priority Data
Aug. 5, 2015 (JP) .................................. 2015-155418

(51) Int. Cl.
| | |
|---|---|
| *C08G 8/04* | (2006.01) |
| *C04B 24/32* | (2006.01) |
| *C04B 24/30* | (2006.01) |
| *C04B 28/04* | (2006.01) |
| *C04B 24/22* | (2006.01) |
| *C04B 24/24* | (2006.01) |
| *C08G 8/08* | (2006.01) |
| *C04B 103/40* | (2006.01) |

(52) U.S. Cl.
CPC .............. *C08G 8/04* (2013.01); *C04B 24/22* (2013.01); *C04B 24/226* (2013.01); *C04B 24/246* (2013.01); *C04B 24/302* (2013.01); *C04B 24/32* (2013.01); *C04B 28/04* (2013.01); *C08G 8/08* (2013.01); *C04B 2103/408* (2013.01)

(58) Field of Classification Search
CPC .............. C08G 8/04; C08G 8/08; C04B 28/04
See application file for complete search history.

(56) References Cited

U.S. PATENT DOCUMENTS

2008/0108732 A1* 5/2008 Wieland ................. C04B 24/32
524/4

FOREIGN PATENT DOCUMENTS

| JP | S59-18338 A | 1/1984 |
|---|---|---|
| JP | 2628486 B2 | 7/1997 |
| JP | 2774445 B2 | 7/1998 |
| JP | 2000-178330 A | 6/2000 |
| JP | 2000-302838 A | 10/2000 |
| JP | 2008-517080 A | 5/2008 |
| JP | 4381923 B2 | 12/2009 |
| JP | 4491078 B2 | 6/2010 |
| JP | 2011-136844 A | 7/2011 |
| JP | 2014-503667 A | 2/2014 |
| JP | 6507809 B2 | 5/2014 |
| JP | 5623672 B2 | 11/2014 |
| JP | 2015-518506 A | 7/2015 |
| WO | 2006/042709 A1 | 4/2006 |

OTHER PUBLICATIONS

Nov. 1, 2016 International Search Report issued in International Patent Application No. PCT/JP2016/072963.
Nov. 1, 2016 Written Opinion issued in International Patent Application No. PCT/JP2016/072963.

* cited by examiner

*Primary Examiner* — Kuo Liang Peng
(74) *Attorney, Agent, or Firm* — Oliff PLC

(57) ABSTRACT

A polycondensation product containing a phenolic copolymer useful for a hydraulic-composition dispersant that has stable dispersability and can obtain a prescribed fluidity, including a copolymer obtained by polycondensing a monomeric mixture including compounds A-D of formulas (A)-(D). A hydraulic-composition dispersant containing the product or copolymer. In the formulas, A1O, A2O, A3O, and A4O represent a C2-4 alkylene oxide group; m, n represent a number from 0 to 300 and m+n≥1; p, q represent a number from 1 to 300; X represents a hydrogen atom, alkyl group, or C1-24 acyl group; R0, R1 represent a hydrogen atom, alkyl group or alkenyl group; Y1, Y2 represent a hydrogen atom, phosphoester group, or sulfate ester group; Y3 represents a phosphoester or a sulfate ester group; R2 represents a hydrogen atom, carboxyl group, C1-10 alkyl group, C2-10 alkenyl group, phenyl group, napthyl group, or heterocyclic group; r represents a number from 1-100.

17 Claims, No Drawings

POLYCONDENSATION PRODUCT CONTAINING PHENOLIC COPOLYMER AND DISPERSANT FOR HYDRAULIC COMPOSITION CONTAINING THE SAME

TECHNICAL FIELD

The present invention relates to a novel polycondensation product containing a phenolic copolymer. In particular, the present invention relates to a polycondensation product obtained by copolymerization of a monomer mixture containing derivatives of an alkylene oxide adduct of hydroxyethyl phenol and an alkylene oxide adduct of phenol, and an aldehyde.

BACKGROUND ART

In recent years, a low-quality aggregate that has not been actively used as a concrete material has been increasingly used with depletion of a good-quality fine aggregate such as river sand. In a hydraulic composition using the low-quality fine aggregate, the viscosity in a fresh state is high even at a general water powder ratio (W/B), and the workability tends to be decreased. Such problems are likely to occur when the content of impurities (e.g., clay) contained in the aggregate is particularly large.

Further, an aggregate used as a material for the hydraulic composition is a natural product, and thus the content of impurities varies. When a conventional polycarboxylic acid-based dispersant is used, the amount of the dispersant that is necessary for obtaining constant flowability varies depending on the kind and derivation of used aggregate, and the like. Therefore, in the actual production of the hydraulic composition, it is necessary to adjust the amount of the dispersant used during using. Accordingly, the operation is complicated in various terms. When a large amount of the low-quality aggregate is used, it is often necessary that the amount of the dispersant added be increased to secure constant flowability. This causes an increase in production cost.

Some examples of the prior art to solve the problems are disclosed. The examples include a method for using the conventional polycarboxylic acid-based dispersant in combination with another component and a method for optimizing the structure of the polycarboxylic acid-based dispersant itself. By the methods, the flowability is improved and the effectiveness as a polycarboxylic acid-based water reducing agent is enhanced.

As one example of the method for using the other component in combination, proposed is the use of a substance containing an inorganic cation (e.g., calcium nitrate), a substance containing an organic cation (e.g., tetrabutylammonium bromide), and a polar organic molecule (e.g., polyethylene glycol and sodium hexametaphosphate) as clay activity-modifying substances in combination with an EO/PO plasticizer (i.e., polycarboxylic acid-based water reducing agent) during use of a low-quality aggregate containing a swellable clay (e.g., smectite and montmorillonite) (Patent Document 1). Thus, the effectiveness of the polycarboxylic acid-based water reducing agent is improved. Further, proposed is the use of a cationic polymer containing a quaternary nitrogen (e.g., poly(diallyldimethylammonium) salt) in combination with a high-performance water reducing agent or a high-performance AE water reducing agent (polycarboxylic acid-based water reducing agent) during use of a low-quality fine aggregate (Patent Document 2). Thus, the fresh state of concrete viscosity, flow retention, and the like is improved. Moreover, proposed is the use of a polycationic compound (e.g., polydiallyldimethylammonium chloride) and a polyhydroxyl or hydroxyl carboxylate component (e.g., sodium gluconate) in combination with a polycarboxylate-based dispersant during use of a clay-containing aggregate (Patent Document 3). The dispersant improves the maintenance of dose efficiency exhibited in cement mortar.

As one example of the method for improving the structure of the polycarboxylic acid-based dispersant itself, the use of a comb copolymer containing a main hydrocarbon chain and a side chain containing a gem-bisphosphonate group in addition to a carboxy group and a polyoxyalkylene group as a superplasticizer for a suspended substance of mineral particles is proposed (Patent Document 4). Thus, the flowability of the suspended substance is improved.

PRIOR ART DOCUMENTS

Patent Documents

Patent Document 1: Japanese Patent No. 4491078
Patent Document 2: Japanese Patent No. 4381923
Patent Document 3: Japanese Patent Application Publication No. 2011-136844 (JP 2011-136844 A)
Patent Document 4: Japanese Patent No. 5623672

SUMMARY OF THE INVENTION

Problem to be Solved by the Invention

However, these proposes do not achieve sufficient flowability without being largely influenced by the kinds of the used aggregate and the content of impurities.

Therefore, a novel dispersant for hydraulic composition that can express constant flowability with change of the used aggregate without substantially changing the addition amount regardless of high or low quality of the aggregate is required.

On the other hand, the use of an alkylene oxide adduct of hydroxyethyl phenol as a raw material for an additive for hydraulic composition has not been proposed.

In view of the conventional techniques, the present invention has been made to improve the performance of a dispersant for hydraulic composition. An object of the present invention is to provide a dispersant for hydraulic composition that has stable dispersibility regardless of the content of impurities in an aggregate, and can achieve predetermined flowability without substantially changing the addition amount depending on the kind of the aggregate, and a novel polycondensation product containing a phenolic copolymer useful as such a dispersant for hydraulic composition.

Means for Solving the Problems

The inventors of the present invention have intensively studied. As a result, the inventors have found that when a copolymer prepared by using an alkylene oxide adduct of hydroxyethyl phenol that has not been investigated as a material for an additive for a hydraulic composition as a monomer component of a polycondensation product containing a phenolic copolymer, that is, by incorporating a structural unit derived from the alkylene oxide adduct of hydroxyethyl phenol into a structure of the copolymer, or a polycondensation product containing the copolymer is used as the additive for the hydraulic composition, a hydraulic composition having desired flowability can be provided regardless of the kinds and amounts of impurities such as an argillaceous material contained in an aggregate. Thus, the present invention has been completed.

Specifically, the present invention relates to a polycondensation product containing a copolymer obtained by polycondensation of a monomer mixture containing a compound A of the following Formula (A), a compound B of the following Formula (B), a compound C of the following Formula (C), and one or more aldehyde compounds D of the following Formula (D).

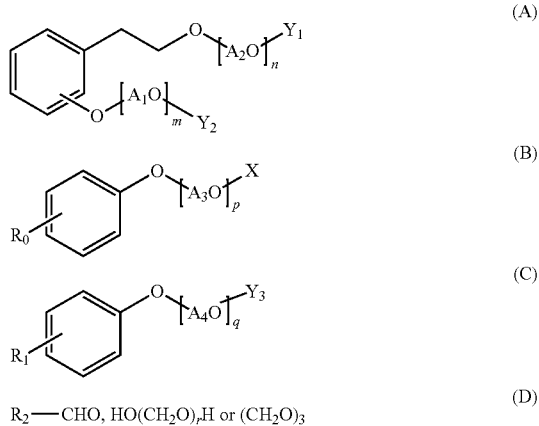

$R_2$—CHO, HO(CH$_2$O)$_r$H or (CH$_2$O)$_3$ (D)

(wherein $A_1O$ and $A_2O$ are each independently a $C_{2-4}$ alkylene oxide group; m and n are an average number of moles of alkylene oxide added, and are each independently a number of 0 to 300, and m+n is 1 or more; $A_3O$ is a $C_{2-4}$ alkylene oxide group; p is an average number of moles of alkylene oxide added, and is a number of 1 to 300; X is a hydrogen atom, a $C_{1-10}$ alkyl group, or a $C_{2-24}$ acyl group; $A_4O$ is a $C_{2-4}$ alkylene oxide group; q is an average number of moles of alkylene oxide added, and is a number of 1 to 300; $R_0$ is a hydrogen atom, a $C_{1-24}$ alkyl group, or a $C_{2-24}$ alkenyl group; $R_1$ is a hydrogen atom, a $C_{1-24}$ alkyl group, or a $C_{2-24}$ alkenyl group; $Y_1$ and $Y_2$ are each independently a hydrogen atom, a phosphate group, or a sulfate group; $Y_3$ is a phosphate group or a sulfate group; $R_2$ is a hydrogen atom, a carboxyl group, a $C_{1-10}$ alkyl group, a $C_{2-10}$ alkenyl group, a phenyl group, a naphthyl group, or a heterocyclic group; and r is a number of 1 to 100.)

It is preferable that the monomer mixture of the polycondensation product contains the compounds A to D at a ratio by mole of the compounds A, B, and C, compound A:compound B:compound C, of 0.1 to 2:0.1 to 2:0.1 to 4, and at a ratio by mole of the compound D to the total amount by mole of the compounds A, B, and C, (compound A+compound B+compound C):compound D, of 1 to 10:10 to 1.

The monomer mixture of the polycondensation product may contain two or more compounds B of Formula (B), and may further contain two or more compounds C of Formula (C).

The present invention further relates to a dispersant for hydraulic composition containing the polycondensation product described above or a copolymer.

The present invention is also directed to a copolymer obtained by polycondensation of the monomer mixture containing the compound A of Formula(A), the compound B of Formula (B), the compound C of Formula (C), and one or more aldehyde compounds D of Formula (D).

Effects of the Invention

The present invention can provide a dispersant for hydraulic composition that can express excellent dispersion stability for a hydraulic composition regardless the kinds and contents of impurities in an aggregate without largely changing the addition amount, and has favorable constructability including high water reduction, a decrease in mixing time taken to make the hydraulic composition into a flow state, favorable stability over time, low concrete viscosity, and low setting retardation. Further, the present invention can provide a phenolic copolymer and a polycondensation product containing the same that are suitably used as the dispersant.

The polycondensation product containing the copolymer of the present invention has an effect capable of decreasing an undesired influence that may be caused by the presence of a carbon component in the hydraulic composition, typically unburned carbon component. That is, the polycondensation product or copolymer of the present invention has an effect capable of maintaining high water reduction even when the polycondensation product or the copolymer is blended as a dispersant for hydraulic composition in a concrete composition blended with fly ash (FA), and an effect capable of imparting a hardened product having excellent appearance. In particular, in a hardened product of the FA-blended composition, the occurrence of darkening on a surface of the concrete that is caused by bringing the unburned carbon to the surface can be suppressed.

MODES FOR CARRYING OUT THE INVENTION

As described above, the polycondensation product or copolymer of the present invention is a polycondensation product or copolymer that is useful as an additive for a hydraulic composition and can suppress the deterioration of flowability of the hydraulic composition that may be caused in the presence of impurities including an argillaceous material and clay such as bentonite.

Examples of the impurities in the hydraulic composition in which the polycondensation product or copolymer of the present invention is applied include an argillaceous material and clay.

The argillaceous material herein means collected granules that are defined as substances passed through a metal sieve with a nominal size of 75 μm specified by JIS Z8801-1.

The clay herein means a substance containing a clay mineral having a layered structure and a clay mineral having no layered structure, such as imogolite and allophane. Examples of the clay mineral having a layered structure include swellable minerals such as smectite, vermiculite, montmorillonite, bentonite, illite, hectorite, halloysite, mica, and brittle mica; and non-swellable minerals such as a kaolin mineral (kaolinite), serpentine, pyrophyllite, talc, and chlorite.

The polycondensation product or copolymer of the present invention is suitably used in the hydraulic composition as an additive for the hydraulic composition, and is particularly suitably used in a hydraulic composition containing coal ash such as fly ash, cinder ash, clinker ash, or bottom ash, or a pozzolanic fine powder such as silica fume, silica dust, a molten silica fine powder, blast furnace slag, volcanic ash, clay silicate, diatomaceous earth, metakaolin, silica sol, or precipitated silica.

<Polycondensation Product and Copolymer>

The present invention is directed to a polycondensation product containing a copolymer obtained by copolymerization of a monomer mixture containing an alkylene oxide adduct of hydroxyethyl phenol or a derivative thereof (compound A), an alkylene oxide adduct of phenol or a derivative thereof (compound B), a phosphate or sulfate derivative of alkylene oxide adduct of phenol (compound C), and an aldehyde (compound D), and the copolymer.

In the present invention, the "polycondensation product containing the copolymer obtained by polycondensation of the monomer mixture" includes all: (1) an aspect including a copolymer (copolymer 1) in which all the components of the monomer mixture, that is, all the compounds A to D, are polycondensed; (2) an aspect including a copolymer (copolymer 2) in which one or two of the compounds A to C, and the compound D, in the monomer mixture are polycondensed; (3) an aspect including the two copolymers of the aspects (1) and (2) described above (copolymers 1 and 2); and (4) an aspect including the copolymer of the aspect (1) and/or (2) (copolymer 1 and/or 2) and at least one of unreacted compounds A to D. In general, the "polycondensation product" includes components including unreacted components and side reactants that are generated in each polymerization step and a step of preparing each component (compounds A to D), for example, a step of adding alkylene oxide.

Hereinafter, the compounds A to D contained in the monomer mixture will be described in detail.

[Compound A of Formula (A)]

The compound A is an alkylene oxide adduct of hydroxyethyl phenol or a derivative thereof, and has a structure of the following Formula (A).

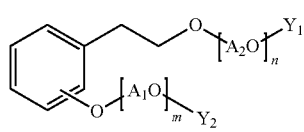

(A)

In the formula, $A_1O$ and $A_2O$ are each independently a $C_{2-4}$ alkylene oxide group, m and n are an average number of moles of alkylene oxide added, and are each independently a number of 0 to 300, and m+n is 1 or more.

$Y_1$ and $Y_2$ are each independently a hydrogen atom, a phosphate group, or a sulfate group.

The compound A is a compound in which a $C_{2-4}$ alkylene oxide is added to hydroxyethyl phenol, and specifically, at least one or both of a hydroxyethyl group and a phenolic hydroxy group. The compound A also includes a derivative (phosphate or sulfate) of the alkylene oxide adduct.

The hydroxyethyl phenol may be o-hydroxyethyl phenol, m-hydroxyethyl phenol, or p-hydroxyethyl phenol. The compound A is preferably a compound in which a $C_{2-4}$ alkylene oxide is added to o-hydroxyethyl-phenol (or an ester derivative thereof).

Examples of the $C_{2-4}$ alkylene oxide include ethylene oxide, propylene oxide, and butylene oxide. The alkylene oxides can be added alone or in combination. When two or more alkylene oxides are used, the addition form may be a block addition form or a random addition form.

Examples of the $C_{2-4}$ alkylene oxide group in $A_1O$ and $A_2O$ described above include ethylene oxide group, propylene oxide group, and butylene oxide group. $A_1O$ and $A_2O$ may include only ethylene oxide group, propylene oxide group, or butylene oxide group, or may contain two or more groups thereof. When $A_1O$ and $A_2O$ contain the two or more groups, the addition form may be a random addition form or a block addition form.

m and n are an average number of moles of alkylene oxide added, and are each independently a number of 0 to 300, and preferably a number of 0 to 60, and m+n is 1 or more. When the number of moles of alkylene oxide added in $A_1O$ and $A_2O$ is increased, improved water reduction can be expected.

When $Y_1$ and $Y_2$ are a phosphate group, they are a phosphate monoester and/or a salt thereof, a phosphate diester and/or a salt thereof, a phosphate triester, or a mixture thereof. When $Y_1$ and $Y_2$ are a sulfate group, they are a sulfate monoester and/or a salt thereof, a sulfate diester, or a mixture thereof.

Examples of a salt of phosphate or sulfate include salts of alkali metal such as sodium and potassium; salts of group II metal such as calcium and magnesium; ammonium salts; and organic ammonium salts such as alkanolammonium and alkanolammonium.

When a terminal of the compound A is made anionic, that is, a phosphate or sulfate derivative is formed, the time of mixing mortar during addition to the hydraulic composition can be shortened.

One kind of the compound A of Formula (A) may be used alone, or two or more kinds thereof may be used in combination.

[Compound B of Formula (B)]

The compound B is an alkylene oxide adduct of phenol or a derivative thereof, and has a structure of the following Formula (B).

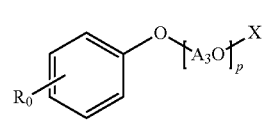

(B)

In the formula, $A_3O$ is a $C_{2-4}$ alkylene oxide group, p is an average number of moles of alkylene oxide added, and is a number of 1 to 300, $R_0$ is a hydrogen atom, a $C_{1-24}$ alkyl group, or a $C_{2-24}$ alkenyl group, and X is a hydrogen atom, a $C_{1-10}$ alkyl group, or a $C_{2-24}$ acyl group.

The compound B is a compound in which a $C_{2-4}$ alkylene oxide is added to phenol or a substitution product thereof. The compound B also includes a derivative (alkyl ester or fatty acid ester) of the alkylene oxide adduct.

Examples of the $C_{2-4}$ alkylene oxide include ethylene oxide, propylene oxide, and butylene oxide. The alkylene oxides can be added alone or in combination. When two or more alkylene oxides are used, the addition form may be a block addition form or a random addition form.

Examples of the $C_{2-4}$ alkylene oxide group in $A_3O$ include ethylene oxide group, propylene oxide group, and butylene oxide group. $A_3O$ may include only ethylene oxide group, propylene oxide group, or butylene oxide group, or may contain two or more groups thereof. When $A_3O$ contains the two or more groups, the addition form thereof may be a random addition form or a block addition form.

p is an average number of moles of alkylene oxide added, and is a number of 1 to 300, and preferably a number of 1 to 150. When the number of moles of alkylene oxide added in $A_3O$ is increased, improved water reduction can be expected.

Examples of the $C_{1-24}$ alkyl group in the $R_0$ include methyl group, ethyl group, n-propyl group, isopropyl group, cyclopropyl group, n-butyl group, isobutyl group, sec-butyl group, tert-butyl group, n-pentyl group, neopentyl group, cyclopentyl group, n-hexyl group, cyclohexyl group, n-octyl group, n-decyl group, 1-adamantyl group, dodecyl group (lauryl group), tetradecyl group (myristyl group), hexadecyl group (palmityl group), octadecyl group (stearyl group), icosyl group, docosyl group (behenyl group), and tetracosyl group. The $C_{1-24}$ alkyl groups may have a branched or cyclic structure.

Examples of the $C_{2-24}$ alkenyl group include groups in which one carbon-carbon bond in the $C_{1-24}$ alkyl groups is a carbon-carbon double bond. Specific examples thereof include ethenyl group, propenyl group, butenyl group, pentenyl group, hexenyl group, heptenyl group, octenyl group, nonenyl group, decenyl group, dodecenyl group, tetradecenyl group, hexadecenyl group, octadecenyl group, eicosenyl group, docosenyl group, and tetracosenyl group. The $C_{2-24}$ alkenyl group may have a branched or cyclic structure.

When $R_0$ in the compound B is a $C_{1-24}$ alkyl group (alkyl substitution product), the flowability when blending fly ash (FA) as a hydraulic powder in the hydraulic composition is improved, and the occurrence of darkening on the surface of the hardened product obtained from the FA-blended hydraulic composition can be suppressed. Further, when the length of carbon chain of $R_0$ is increased, it can be expected that the appearance of the hardened product obtained from the FA-blended hydraulic composition is improved.

The $C_{1-10}$ alkyl group in X may have a branched or cyclic structure. Specific examples of the $C_{1-10}$ alkyl group include $C_{1-10}$ alkyl groups that are exemplified by specific examples of the $C_{1-24}$ alkyl group in $R_0$.

Examples of the $C_{2-24}$ acyl group include saturated and unsaturated acyl groups (R'(CO)— group, wherein R' is $C_{1-23}$ hydrocarbon group). Examples of the saturated $C_{2-24}$ acyl groups include acyl groups derived from carboxylic acids and fatty acids such as acetic acid, propionic acid, butanoic acid, pentanoic acid, hexanoic acid (caproic acid), heptanoic acid, octanoic acid (caprylic acid), nonanoic acid, decanoic acid (capric acid), dodecanoic acid (lauric acid), tetradecanoic acid (myristic acid), pentadecanoic acid (pentadecylic acid), hexadecanoic acid (palmitic acid), heptadecanoic acid (margaric acid), octadecanoic acid (stearic acid), nonadecanoic acid, eicosanoic acid (arachidic acid), docosanoic acid (behenic acid), and tetracosanoic acid (lignoceric acid). Examples of monounsaturated acyl group include acyl groups derived from monounsaturated fatty acids such as myristoleic acid, palmitoleic acid, oleic acid, elaidic acid, vaccenic acid, gadoleic acid, eicosenoic acid, erucic acid, and nervonic acid. Examples of diunsaturated acyl group include acyl groups derived from diunsaturated fatty acids such as linoleic acid, eicosadienoic acid, and docosadienoic acid. Examples of triunsaturated acyl group include acyl groups derived from triunsaturated fatty acids such as linolenic acid, pinolenic acid, eleostearic acid, mead acid, dihomo-γ-linolenic acid, and eicosatrienoic acid.

The X is preferably a hydrogen atom or an acetyl group.

One kind of the compound B of Formula (B) may be used alone, or two or more kinds thereof may be used in combination. When two or more compounds are used in combination as the compound B in the monomer mixture described below, an effect of improving the retention ratio of mortar flow can be expected.

[Compound C of Formula (C)]

The compound C is a phosphate or sulfate derivative of alkylene oxide adduct of phenol, and has a structure of the following Formula (C).

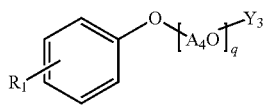

(C)

In the formula, $A_4O$ is a $C_{2-4}$ alkylene oxide group, q is an average number of moles of alkylene oxide added, and is a number of 1 to 300, $R_1$ is a hydrogen atom, a $C_{1-24}$ alkyl group, or a $C_{2-24}$ alkenyl group, and $Y_3$ is a phosphate group or a sulfate group.

The compound C is a phosphate or sulfate derivative of a compound in which a $C_{2-4}$ alkylene oxide is added to phenol or a substitution product thereof.

Examples of the $C_{2-4}$ alkylene oxide include ethylene oxide, propylene oxide, and butylene oxide. The alkylene oxides can be added alone or in combination. When two or more alkylene oxides are used, the addition form may be a block addition form or a random addition form.

Examples of the $C_{2-4}$ alkylene oxide group in $A_4O$ include ethylene oxide group, propylene oxide group, and butylene oxide group. $A_4O$ may include only ethylene oxide group, propylene oxide group, or butylene oxide group, or may contain two or more groups thereof. When $A_4O$ contains the two or more groups, the addition form thereof may be a random addition form or a block addition form.

q is an average number of moles of alkylene oxide added, and is a number of 1 to 300, and preferably a number of 1 to 40.

Specific examples of the $C_{1-24}$ alkyl group and the $C_{2-24}$ alkenyl group in $R_1$ include specific examples of $R_0$ in the description of the compound B.

When $R_1$ in the compound C is a $C_{1-24}$ alkyl group (alkyl substitution product), the flowability when blending fly ash (FA) as a hydraulic powder in the hydraulic composition is improved, and the occurrence of darkening on the surface of the hardened product obtained from the FA-blended hydraulic composition can be suppressed. Further, when the length of carbon chain of $R_1$ is increased, it can be expected that the appearance of the hardened product obtained from the FA-blended hydraulic composition is improved.

When $Y_3$ is a phosphate group, it is a phosphate monoester and/or a salt thereof, a phosphate diester and/or a salt thereof; a phosphate triester, or a mixture thereof. When $Y_3$ is a sulfate group, it is a sulfate monoester and/or a salt thereof, a sulfate disulfate, or a mixture thereof.

Examples of a salt of phosphate or sulfate include salts of alkali metal such as sodium and potassium; salts of group II metal such as calcium and magnesium; ammonium salts; and organic ammonium salts such as alkylammonium and alkanolammonium.

Examples of the compound C of Formula (C) include compounds of the following Formulae.

In the formulae, $R_1$, $A_4O$, and q are as defined for Formula (C) described above. Ph is a phenylene group. M is a hydrogen atom; an alkali metal atom such as sodium or potassium; an alkaline earth metal atom such as calcium or magnesium; an ammonium group; or an organic ammonium group such as an alkylammonium group or an alkanolammonium group.

Z is a polyoxyalkylene alkyl ether residue of Formula: R''—O-(A'O)s- (wherein R'' is a $C_{1-24}$ alkyl group, NO is a $C_{2-3}$ oxyalkylene group, that is, an oxyethylene group or an oxypropylene group, and s is an average number of moles of oxyalkylene group NO added, and is 1 to 100). When the number of Z is plural, the groups of Zs may be the same or different.

Phosphate Monoester and Salt Thereof $R_1$-Ph-O-[$A_4O$]$q$-P(=O)(—OM)$_2$

Phosphate Diester and Salt Thereof

[R$_1$-Ph-O-[A$_4$O]$q$-]$_2$P(=O)(—OM)

[R$_1$-Ph-O-[A$_4$O]$q$-](Z—)P(=O)(—OM)

Phosphate Triester

[R$_1$-Ph-O-[A$_4$O]$q$-]$_3$P(=O)

[R$_1$-Ph-O-[A$_4$O]$q$-]$_2$(Z—)P(=O)

[R$_1$-Ph-O-[A$_4$O]$q$-](Z—)$_2$P(=O)

Sulfate Monoester and Salt Thereof

R$_1$-Ph-O-[A$_4$O]$q$-S(=O)$_2$(—OM)

Sulfate Diester

[R$_1$-Ph-O-[A$_4$O]$q$-]$_2$S(=O)$_2$

[R$_1$-Ph-O-[A$_4$O]$q$-](Z—)S(=O)$_2$

One kind of the compound C of Formula (C) may be used alone, or two or more kinds thereof may be used in combination.

[Aldehyde Compound D of Formula (D)]

The compound D is an aldehyde, and has a structure of the following Formula (D).

$$R_2—CHO, HO(CH_2O)_rH \text{ or } (CH_2O)_3 \quad (D)$$

In the formula, R$_2$ is a hydrogen atom, a carboxyl group, a C$_{1-10}$ alkyl group, a C$_{2-10}$ alkenyl group, a phenyl group, a naphthyl group, or a heterocyclic group, and r is a number of 1 to 100.

The alkyl group, alkenyl group, phenyl group, naphthyl group, and heterocyclic group may be substituted with an optional substituent such as a C$_{1-10}$ alkyl group; an aryl group such as a phenyl group or a naphthyl group; a halogen atom such as a chlorine atom or a bromine atom; a sulfonic acid functional group such as a sulfo group or a sulfonate salt group; an acyl group such as an acetyl group; a hydroxy group; an amino group; or a carboxyl group.

The C$_{1-10}$ alkyl group in R$_2$ may have a branched or cyclic structure. Specific examples thereof include methyl group, ethyl group, n-propyl group, isopropyl group, cyclopropyl group, n-butyl group, isobutyl group, sec-butyl group, tert-butyl group, n-pentyl group, neopentyl group, cyclopentyl group, n-hexyl group, cyclohexyl group, n-octyl group, n-decyl group, and 1-adamantyl group.

The C$_{2-10}$ alkenyl group may have a branched or cyclic structure. Specific examples thereof include vinyl groups, propenyl group, butenyl group, pentenyl group, hexenyl group, heptenyl group, nonenyl group, and decenyl group.

Examples of the heterocyclic group include furyl group, thienyl group, pyridyl group, piperidyl group, and morpholino group.

r is preferably a number of 2 to 100.

Examples of the compound D include formaldehyde, paraformaldehyde, trioxane, glyoxylic acid, acetaldehyde, trichloroacetaldehyde, propionaldehyde, butyraldehyde, isobutylaldehyde, valeraldehyde, hexylaldehyde, heptanal, octylaldehyde, nonylaldehyde, isononylaldehyde, decylaldehyde, dodecanal, acrolein, crotonaldehyde, pentenal, hexenal, heptenal, octenal, cinnamaldehyde, benzaldehyde, benzaldehydesulfonic acid, benzaldehydedisulfonic acid, anisaldehyde, salicylaldehyde, benzylaldehyde [(C$_6$H$_5$)$_2$C(OH)—CHO], naphthaldehyde, and furfural. In particular, the compound D may be selected from the group consisting of formaldehyde, paraformaldehyde, benzaldehyde, or an optional mixture of two or more kinds thereof.

The compound D can be used as a pure crystal or powder, or a hydrate thereof. Alternatively, the compound D can be used in a form of aqueous solution such as formalin. In this case, the calculation or mixing of components can be simplified.

One kind of the compound D of Formula (D) may be used alone, or two or more kinds thereof may be used in combination.

[Monomer Mixture]

In the monomer mixture containing the compounds A to D used in the polycondensation product of the present invention, the blending ratio thereof is not particularly limited. The compounds A to D are contained preferably at a ratio by mole of the compounds A, B, and C, compound A:compound B:compound C, of 0.1 to 2:0.1 to 2:0.1 to 4, and at a ratio by mole of the compound D to the total amount by mole of the compounds A, B, and C, (compound A+compound B+compound C):compound D, of 1 to 10:10 to 1, and more preferably at a ratio by mole, compound A:compound B:compound C, of 0.1 to 1.0:0.5 to 1.5:0.5 to 3.5 and a ratio by mole, (compound A+compound B+compound C):compound D, of 2 to 6:10 to 1.

When the blending ratio of the compound A in the monomer mixture is increased, the flowability can be secured when blending impurities such as an argillaceous material in the hydraulic composition. A decrease in setting time can be also expected. When the blending ratio of the compound C is adjusted, the water reduction and retention of the hydraulic composition can be adjusted.

[Copolymer and Polycondensation Product]

The polycondensation product of the present invention includes a copolymer obtained by polycondensation of the monomer mixture containing the compounds A to D.

A method for producing the compounds A to D to obtain the copolymer and a polymerization method for the copolymer are not particularly limited.

An addition order of the compounds A to D and a method of adding the compounds A to D during polycondensation are not particularly limited. For example, the whole amounts of the compounds A to D may be added once before a polycondensation reaction, a part of the compounds A to D may be added before a polycondensation reaction, and the rest may be separately added by addition dropwise, or a part of the compounds A to D may be added before a polycondensation reaction, and after a certain reaction time, the rest may be further added.

The polycondensation product can be obtained, for example, by polycondensation of the compounds A to D at a reaction temperature of 80° C. to 150° C. at a pressure from normal pressure to a pressure such as 0.001 to 1 MPa in the presence of a dehydration catalyst in the presence or absence of a solvent.

Examples of the dehydration catalyst include hydrochloric acid, perchloric acid, nitric acid, formic acid, methanesulfonic acid, octylsulfonic acid, dodecylsulfonic acid, vinylsulfonic acid, allylsulfonic acid, phenolsulfonic acid, acetic acid, sulfuric acid, diethyl sulfate, dimethyl sulfate, phosphoric acid, oxalic acid, boric acid, benzoic acid, phthalic acid, salicylic acid, pyruvic acid, maleic acid, malonic acid, nitrobenzoic acid, nitrosalicylic acid, para-toluenesulfonic acid, benzenesulfonic acid, dodecylbenzenesulfonic acid, trifluoromethanesulfonic acid, fluoroacetic acid, thioglycolic acid, mercaptopropionic acid, and activated clay. One kind of the dehydration catalyst may be used alone, or two or more kinds thereof may be used in combination.

When the polycondensation reaction is carried out in the presence of a solvent, water, a glycol ether compound such as propylene glycol monomethyl ether (PGME), an aromatic compound such as toluene or xylene, or an alicyclic compound such as methylcyclohexane may be used as the solvent. Further, a compound usable as the dehydration catalyst (acid catalyst), such as acetic acid, may be used as the solvent.

The polycondensation reaction can be carried out preferably at a reaction temperature of 95° C. to 130° C. When the polycondensation reaction is carried out for 3 to 25 hours, the polycondensation reaction can be completed.

The polycondensation reaction is carried out preferably under an acidic condition. pH in the reaction system is preferably 4 or less.

In addition to the compounds A to D, another monomer capable of being polycondensed with the compounds may be blended in the monomer mixture without impairing the effects of the present invention.

Examples of the other monomer include adducts of cresol, catechol, resorcinol, nonylphenol, methoxyphenol, naphthol, methylnaphthol, butylnaphthol, bisphenol A, aniline, methylaniline, hydroxyaniline, methoxyaniline, and/or salicylic acid with 1 to 300 mol of alkylene oxide, phenol, phenoxyacetic acid, methoxyphenol, resorcinol, cresol, bisphenol A, nonylphenol, aniline, methylaniline, N-phenyldiethanolamine, N,N-di(carboxyethyl)aniline, N,N-di(carboxymethyl)aniline, phenolsulfonic acid, and anthranilic acid.

After completion of the polycondensation reaction, a variety of conventional method can be adopted to decrease the content of an unreacted aldehyde component (compound D) in the reaction system. Examples thereof include a method in which the pH in the reaction system is changed to alkaline followed by a heating treatment at 60 to 140° C., a method in which the pressure of the reaction system is reduced (−0.1 to −0.001 MPa) to volatilize and remove the aldehyde component, and a method in which small amounts of sodium hydrogen sulfite, ethyleneurea, and/or polyethyleneimine are added.

After the completion of the polycondensation reaction, the dehydration catalyst used in the reaction can be neutralized to make a salt form, and then removed through filtration. In an aspect in which the catalyst is not removed, the performance as the dispersant for hydraulic composition of the present invention as described below is also not impaired. In addition to the filtration, examples of a method for removing the catalyst include phase separation, dialysis, ultrafiltration, and use of ion exchanger.

When the reactant is neutralized and diluted with water or the like, the workability of measurement and the like during use of the dispersant for hydraulic composition described below is improved. In this case, examples of a basic compound used in the neutralization include alkali hydroxides such as sodium hydroxide and potassium hydroxide, alkaline earth hydroxides such as calcium hydroxide, and organic amines such as ammonia, mono ethanol amine, diethanol amine, and triethanol amine. Among these, one kind or a combination of two or more kinds thereof is adopted.

The weight average molecular weight (gel permeation chromatography (hereinafter referred to as "GPC") in terms of polyethylene glycol) of copolymer of the present invention to be finally obtained appropriately falls within a range of 5,000 to 100,000, preferably a range of 10,000 to 80,000, and particularly preferably a range of 15,000 to 35,000 so that excellent dispersion performance is expressed.

The "polycondensation product" in the present invention may be only the copolymer obtained by copolymerization of the monomer mixture containing the compounds A to D as described above. However, the polycondensation product in the present invention generally includes a component including an unreacted component and a side reactant that are generated in each polymerization step and a step of adding alkylene oxide.

<Applications of Polycondensation Product and Copolymer>

The polycondensation product and the copolymer of the present invention can widely exert a performance as a dispersant in an aqueous dispersion of various types of solid powder. The polycondensation product and the copolymer of the present invention may be used as the dispersant as it is (without addition). Alternatively, the polycondensation product and the copolymer of the present invention may be used in a chemical admixture form obtained in combination with a publicly known additive that is appropriately adopted according to various applications.

<Dispersant for Hydraulic Composition>

Among the applications described above, the polycondensation product or the copolymer of the present invention may be particularly suitably used in a form of dispersant for hydraulic composition containing the polycondensation product or the copolymer.

The hydraulic composition means a powder having physical properties of causing hardening by hydration (hydraulic powder), for example, a composition containing a cement, a gypsum, fly ash, and the like. When the hydraulic powder is a cement, the hydraulic composition is also referred to as cement composition.

The dispersant for hydraulic composition of the present invention may be used in a chemical admixture form obtained in combination with a publicly known additive for hydraulic composition that is appropriately adopted according to various applications. Specifically, at least one kind of other additive selected from the group consisting of a conventionally known cement dispersant, a high-performance AE water reducing agent, a high-performance water reducing agent, an AE water reducing agent, a water reducing agent, an air entraining agent (AE agent), a sudsing agent, an antifoaming agent, a setting retardant, a setting accelerator, a separation reducing agent, a thickener, a shrinkage reducing agent, a sealant, and a water repellent can be blended.

The dispersant for hydraulic composition containing the polycondensation product or the copolymer of the present invention includes a form including the polycondensation product or the copolymer of the present invention, a form of a chemical admixture for a hydraulic composition in which the polycondensation product or the copolymer of the present invention and a publicly known chemical admixture other than the polycondensation product and the copolymer are blended, and a form in which the polycondensation product or the copolymer and the publicly known chemical admixture are separately added during production of a hydraulic composition such as concrete and finally mixed in the hydraulic composition.

In general, a cement dispersant is appropriately used in combination according to conditions of producing concrete and performance requirements. In the present invention, the cement dispersant is also used in combination similarly. The cement dispersant is used singly or as a major agent. The cement dispersant can be used as a modifier aid for a cement dispersant in which slump loss is increased, or as a cement dispersant in which the initial water reduction is high.

Examples of the publicly known cement dispersant include salts of polycarboxylic acid-based copolymer described in Japanese Patent Publication No. S59-18338, and Japanese Patent Nos. 2628486 and 2774445, salts of naphthalene sulfonate formaldehyde condensate, salts of melamine sulfonate formalin condensate, ligninsulfonate salts, sodium gluconate, and sugar alcohol. The blending ratio of the publicly known cement dispersant to the polycondensation product or the copolymer of the present invention is, for example, 1:99 to 99:1 (% by mass).

Specific examples of an air entraining agent include anionic air entraining agents, nonionic air entraining agents, and amphoteric air entraining agents.

Examples of a setting retardant include inorganic setting retardants and organic setting retardants.

Examples of an accelerator include inorganic accelerators and organic accelerators.

Examples of a thickener and a separation reducing agent include cellulose-based water-soluble polymers, polyacrylamide-based water-soluble polymers, biopolymers, and nonionic thickeners.

Examples of an antifoaming agent include nonionic antifoaming agents, silicone-based antifoaming agents, higher alcohols, and mixtures containing them as a main component.

For example, when the dispersant for hydraulic composition of the present invention is applied to a cement composition, a component for the cement composition is a component for conventionally used concrete. Examples thereof include cements (e.g., ordinary portland cement, high-early-strength portland cement, ultra high-early-strength portland cement, low-heat and medium-heat portland cement, and blast furnace cement), aggregates (e.g., fine aggregate and coarse aggregate), chemical admixtures (e.g., silica fume, calcium carbonate powder, blast furnace slag powder, and fly ash), expansive additives, and water.

Examples of a chemical admixture that is one other than the dispersant for hydraulic composition of the present invention and can be separately added during preparation include the publicly known air entraining agent, setting retardant, accelerator, separation reducing agent, thickener, antifoaming agent, and shrinkage reducing agent. They may be appropriately blended. The blending ratio of each of the components can be appropriately determined according to the kinds of selected components and the purposes of use.

The addition amount of the dispersant for hydraulic composition of the present invention varies according to blending conditions including the aforementioned concrete materials. The dispersant for hydraulic composition is generally added in an amount of about 0.05 to 5.0% by mass in terms of solid content relative to the amount of cement, or during use of pozzolanic fine powder such as fly ash in combination, relative to the total amount of cement and fly ash. As the addition amount is larger, the water reduction and slump flow retention are more favorably obtained. However, when the addition amount is too large, setting retardation occurs, and in some cases, hardening may be insufficient.

A method of using the dispersant for hydraulic composition is the same as a method of using a general cement dispersant. A stock solution of the dispersant for hydraulic composition is added during mixing of concrete, or the dispersant for hydraulic composition is diluted with mixing water in advance and added. Alternatively, after concrete or mortar is mixed, the dispersant for hydraulic composition is added, and the mixture is uniformly mixed.

EXAMPLES

Hereinafter, the present invention will be described by using Examples. However, the present invention is not restricted by Examples and Comparative Examples.

In Examples, the physical properties of a sample were measured under the following conditions by using the following devices.
(1) Gel Permeation Chromatography (GPC)
<Conditions of Measurement by Gel Permeation Chromatography (GPC)>
Column: OHpakSB-802.5HQ, OHpakSB-803HQ, OHpakSB-804HQ (manufactured by Showa Denko K.K.)
Eluent: mixed liquid of 50 mM sodium nitrate aqueous solution and acetonitrile (ratio by volume: 80/20)
Detector: differential refractometer, analytical curve: polyethyleneglycol Example 1: Preparation of (A)

<EO Adduct: Use for Polycondensation Products of Examples 1 to 17 and 19>
100 parts of ortho-hydroxyethyl phenol (reagent available from Aldrich) and 0.3 parts of 96% potassium hydroxide were placed in a stainless high-pressure reactor equipped with a thermometer, a stirrer, a pressure gauge, and a nitrogen inlet tube, and the inside of the reactor was replaced with nitrogen. The mixture was heated to 130° C. in a nitrogen atmosphere. While 130° C. was held at safe pressure, 190 parts of ethylene oxide was introduced into the reactor over 4 hours. The temperature was then held for 2 hours, to complete an alkylene oxide addition reaction. Thus, a total of 6-mol EO adduct of ortho-hydroxyethyl phenol was obtained.

Various EO adducts of hydroxyethyl phenol shown in Table 1 described below were prepared in the same manner as this procedure except that the number of moles of ethylene oxide added was changed to various numbers.
<Phosphate Derivative: Use for Polycondensation Product of Example 18>
3 mol of the EO adduct (total 6-mol adduct) of ortho-hydroxyethyl phenol was placed into a glass reactor equipped with a stirrer, a thermometer, and a nitrogen inlet tube. While nitrogen was bubbled, 1 mol of phosphoric anhydride was added at 50° C. over 4 hours, to cause a reaction. Subsequently, an aging reaction was carried out at 100° C. for 3 hours, and a phosphorylation reaction was completed. Thus, ortho-hydroxyethyl phenol EO adduct phosphate was obtained.
<Sulfate Derivative: Use for Polycondensation Product of Example 20>
1 mol of the EO adduct (total 6-mol adduct) of ortho-hydroxyethyl phenol was placed in a glass reactor equipped with a stirrer, a thermometer, and a nitrogen inlet tube. 1 mol of chlorosulfonic acid was added at 40° C. over 3 hours in a nitrogen atmosphere, to cause a sulfation reaction. Subsequently, a dehydrochlorination treatment was carried out for 1 hour by bubbling nitrogen, to obtain an acidic compound.

Separately from the aforementioned reactor, a glass reactor equipped with a stirrer and a thermometer was prepared. 1 mol of 48% sodium hydroxide solution and 4.5 mol of water were placed in the reactor. To this alkali aqueous solution, the whole amount of the acidic compound obtained by the sulfation reaction was added at 40° C. over 3 hours. Thus, a neutralization reaction was carried out. During this process, a 48% sodium hydroxide solution was added as appropriate so that the pH was 7. Thus, the pH was adjusted. As a result, an an aqueous solution of ortho-hydroxyethyl phenol EO adduct sulfate (active ingredient (solid content concentration): 28%) was obtained.

Example 2: Preparation of (B)

80 parts of diethylene glycol monophenyl ether (Hisolv DPH available from Toho Chemical Industry Co., Ltd.) and 0.2 parts of 96% potassium hydroxide were placed in a stainless high-pressure reactor equipped with a thermometer, a stirrer, a pressure gauge, and a nitrogen inlet tube, and the inside of the reactor was replaced with nitrogen. The mixture was heated to 150° C. in a nitrogen atmosphere. While 150° C. was held at safe pressure, 1,700 parts of ethylene oxide was introduced into the reactor over 10 hours. The temperature was then held for 2 hours, to complete an alkylene oxide addition reaction. Thus, polyethylene glycol monophenyl ether (the number of moles of EO added: 90) was obtained.

Various polyethylene glycol monophenyl ethers shown in Table 1 described below were prepared in the same manner as this procedure except that the number of moles of ethylene oxide added was changed to various numbers. A 6-mol ethylene oxide adduct of phenol (see No. 15) was prepared in the same manner as the aforementioned synthesis procedure except that the starting material was changed to phenol. For a 1-mol ethylene oxide adduct of phenol (see No. 16), Hisolv EPH available from Toho Chemical Industry Co., Ltd., was used.

Example 3: Preparation of (C)

<Preparation of EO Adduct>
An ethylene oxide addition reaction was carried out in the same manner as the preparation method for (A) described above except that phenol, p-tert-butylphenol (PTBP, available from DIC Corporation), or p-octylphenol (POP, available from DIC Corporation) was used as a starting material. The number of moles of ethylene oxide added was represented by q in Table 1.

<Phosphorylation and Sulfation>
Phosphorylation and sulfation were carried out in the same manner as the procedures for phosphorylation and sulfation for (A) except that the kind of the starting material was changed.

Preparation Example 1: Preparation of Polycondensation Product of Example 1

The materials (A) to (C) were each placed at a ratio by mole shown in Table 1 in a glass reactor equipped with a stirrer, a thermometer, and a reflux condenser. The mixture was heated to 70° C., and 98% sulfuric acid was then added in an amount of 1.0% by weight relative to the total amount of the materials (A) to (C). Subsequently, a material (D) was added once to the reactor at a ratio by mole shown in Table 1. The mixture was heated to 105° C. When the temperature reached 105° C., the pH of the reactant was 2.1 (1% aqueous solution, 20° C.). Six hours after the temperature reached 105° C., the reaction was terminated. 48% caustic soda was added to the reactor, and neutralization was carried out so that the pH of 1% reactant aqueous solution fallen within a range of 5.0 to 7.5. Subsequently, an appropriate amount of water was added so that the solid content of the reactant was 40%. Thus, an aqueous solution of polycondensation product was obtained. GPC measurement was carried out for the polycondensation product, to determine the weight average molecular weight.

Preparation Examples 2 to 20: Preparation of Polycondensation Products of Examples 2 to 20

Various aqueous solutions of polycondensation products were obtained in the same manner as the procedure in Preparation Example 1 except that the kinds and ratio by mole of the materials (A) to (D) were changed as shown in Table 1.

TABLE 1

| EXAMPLE NO. | (A) (ALL O-BODY) | | | (B) | (C) | | | (D) | | RATIO (BY MOLE) | | | | GPC |
|---|---|---|---|---|---|---|---|---|---|---|---|---|---|---|
| | M | N | $Y_1/Y_2$ | P | P | $R_1$ | $Y_3$ | Q | KIND | A | B | C | D | MW |
| 1 | 3 | 3 | H | 90 | — | H | PHOSPHATE | 6 | FORMALIN | 0.5 | 1.0 | 2.0 | 5.0 | 23,000 |
| 2 | 3 | 3 | H | 140 | — | H | PHOSPHATE | 6 | FORMALIN | 0.5 | 1.0 | 2.0 | 5.0 | 20,000 |
| 3 | 3 | 3 | H | 21 | — | H | PHOSPHATE | 6 | FORMALIN | 0.5 | 1.0 | 2.0 | 5.0 | 25,000 |
| 4 | 3 | 3 | H | 90 | — | H | PHOSPHATE | 2 | FORMALIN | 0.5 | 1.0 | 2.0 | 5.0 | 23,000 |
| 5 | 3 | 3 | H | 90 | — | H | PHOSPHATE | 20 | FORMALIN | 0.5 | 1.0 | 2.0 | 5.0 | 23,000 |
| 6 | 3 | 3 | H | 90 | — | p-t-Bu | PHOSPHATE | 6 | FORMALIN | 0.5 | 1.0 | 2.0 | 5.0 | 23,000 |
| 7 | 3 | 3 | H | 90 | — | p-t-Bu | PHOSPHATE | 6 | FORMALIN | 0.5 | 1.0 | 1.0 | 5.0 | 28,000 |
| 8 | 3 | 3 | H | 90 | — | p-t-Bu | PHOSPHATE | 6 | FORMALIN | 0.5 | 1.0 | 3.0 | 5.0 | 17,000 |
| 9 | 3 | 3 | H | 90 | — | p-Oc | PHOSPHATE | 6 | FORMALIN | 0.5 | 1.0 | 2.0 | 5.0 | 19,000 |
| 10 | 3 | 3 | H | 90 | — | p-t-Bu | PHOSPHATE | 6 | FORMALIN | 0.1 | 1.0 | 2.0 | 5.0 | 21,000 |
| 11 | 3 | 3 | H | 90 | — | p-t-Bu | PHOSPHATE | 6 | FORMALIN | 1.0 | 1.0 | 2.0 | 5.0 | 22,000 |
| 12 | 3 | 3 | H | 90 | — | H/p-t-Bu *1 | PHOSPHATE | 6 | FORMALIN | 0.5 | 1.0 | 1.5/0.5 | 5.0 | 23,000 |
| 13 | 0 | 1 | H | 90 | — | H | PHOSPHATE | 6 | FORMALIN | 0.5 | 1.0 | 2.0 | 5.0 | 23,000 |
| 14 | 45 | 45 | H | 90 | — | H | PHOSPHATE | 6 | FORMALIN | 0.5 | 1.0 | 2.0 | 5.0 | 24,000 |
| 15 | 3 | 3 | H | 90 | 6 *2 | H | PHOSPHATE | 6 | FORMALIN | 0.5 | 0.5/0.5 | 2.0 | 5.0 | 22,000 |
| 16 | 3 | 3 | H | 90 | 1 *2 | H | PHOSPHATE | 2 | FORMALIN | 0.5 | 0.5/0.5 | 2.0 | 5.0 | 20,000 |
| 17 | 3 | 3 | H | 90 | — | H | PHOSPHATE | 6 | PARAFORMALDEHYDE | 0.5 | 1.0 | 2.0 | 5.0 | 26,000 |
| 18 | 3 | 3 | PHOSPHATE *3 | 90 | — | H | PHOSPHATE | 6 | FORMALIN | 0.5 | 1.0 | 2.0 | 5.0 | 23,000 |

TABLE 1-continued

| EX-AM-PLE NO. | (A) (ALL O-BODY) M | N | $Y_1/Y_2$ | (B) P | (C) P | $R_1$ | $Y_3$ | (D) Q | KIND | RATIO (BY MOLE) A | B | C | D | GPC MW |
|---|---|---|---|---|---|---|---|---|---|---|---|---|---|---|
| 19 | 3 | 3 | H | 90 | — | H | PHOSPHATE | 6 | FORMALIN/PARAFORM *4 | 0.5 | 1.0 | 2.0 | 2.0/3.0 | 30,000 |
| 20 | 3 | 3 | SUL-FATE*3 | 90 | — | H | SULFATE | 6 | FORMALIN | 0.5 | 1.0 | 2.0 | 5.0 | 22,000 |

*1 No. 12 contained two kinds of components (C): A compound having an unsubstituted benzene ring (ratio by mole: 1.5) and a p-t-Bu substituted compound (ratio by mole: 0.5) were used in combination (the average number of moles of EO added of both the compounds was 6).
*2 Nos. 15 and 16 contained two kinds of components (B): A compound having an average number of moles of EO added of 90 (ratio by mole: 0.5) and a compound having an average number of moles of EO added of 6 (in No. 16, an average number of moles of EO added of 1) (ratio by mole: 0.5) were used in combination.
*3 No. 18 contained a mixture of phosphate monoester, phosphate diester, and phosphate triester. No. 20 contained a mixture of sulfate monoester and sulfate diester.
*4 No. 19 contained two kinds of components (D): formalin (ratio by mole: 2.0) and paraformaldehyde (ratio by mole: 3.0) were used in combination.

Preparation Comparative Example 1: Preparation of Polycondensation Product of Comparative Example 1

In accordance with the following procedure disclosed in Specification of Japanese Patent No. 5507809 (paragraph [0049] [B.1 Preparation of polycondensation product of Invention]), a polycondensation product of Comparative Example 1 was prepared.

1 mol of poly(ethylene oxide) monophenyl ether (1,000 g/mol), 2 mol of phenoxyethanol phosphate (or a mixture of 2-phenoxyethanol dihydrogen phosphate and 2-phenoxyethanol hydrogen phosphate), 16.3 mol of water, and 2 mol of $H_2SO_4$ were placed in a reactor and stirred. To the obtained solution, 3 mol of formaldehyde in a form of 37% aqueous solution was added dropwise. A polycondensation reaction was completed at 105° C. in 5 hours. After completion of the reaction, the pH of the reaction mixture was changed to 10.5 by using a 20% NaOH aqueous solution. The mixture was held at 105° C. for 30 minutes, and then cooled to room temperature. Water was added to adjust the solid content thereof to about 30% by mass.

For the thus obtained polycondensation product of Comparative Example 1, measurement by gel permeation chromatograph was carried out. The weight average molecular weight Mw thereof was 22,000.

Preparation Comparative Example 2: Preparation of Polycondensation Product of Comparative Example 2

In accordance with the following procedure disclosed in Japanese Patent Application Publication No 2014-503667 (paragraph [0069] [Example 1.1]), a polycondensation product of Comparative Example 2 was prepared.

2-phenoxyethanol (96%, 16.92 g) was placed in a reactor equipped with a jacket set at 70° C. and a mechanical impeller. Polyphosphoric acid (80% in $P_2O_5$, 9.6 g) was added to the reactor with stirring. The mixture was stirred at 80° C. for 30 minutes, and polyoxyethylene monophenyl ether (96%, Mn=5,000 g/mol, 200 g) was added. The mixture was heated to 100° C. To the mixture, concentrated sulfuric acid (96%, 6.10 g), formalin (37%, 9.36 g), and paraformaldehyde (94%, 1.92 g) were added. The mixture was heated to 110 to 115° C., and stirred for 2 hours. Subsequently, the mixture was cooled to 60° C. To the mixture, 32% by mass of sodium hydroxide aqueous solution was added to neutralize the mixture to a pH of 9.1.

For the thus obtained polycondensation product of Comparative Example 2, measurement by gel permeation chromatograph was carried out. The weight average molecular weight Mw thereof was 22,000.

[Test I: Fresh Mortar Test]

<Mortar Blending>

225 g of deionized water (water/cement ratio (by mass): 0.45) containing 500 g of ordinary portland cement available from TAIHEIYO CEMENT CORPORATION or 500 g in total of the ordinary portland cement and fly ash, 1,350 g of fine aggregate or 1,350 g in total of the fine aggregate and argillaceous material (argillaceous material (collected granules) or clay (bentonite and kaolinite)), and as a dispersant for hydraulic composition each of the polycondensation products 1 to 20 or the polycondensation product 1 or 2 in Comparative Examples (each of the polycondensation products was added in an amount in terms of solid content of 0.18% by mass, 0.20% by mass, or 0.22% by mass relative to the amount of cement (see Table 2)) was used. In accordance with a procedure described below, mortar was prepared (see blending of mortar in Table 2).

The argillaceous material (collected granules) used in this test was collected granules obtained by collecting a component having a size of 75 μm or less from mountain sand from Futts. As the argillaceous material (collected granules), a component passed through a metal sieve with a nominal size of 75 μm specified by JIS Z8801-1 was used.

As clay, the following commercially available products were used.

Bentonite: Reagent (available from Wako Pure Chemical Industries, Ltd.)

Kaolinite: RC-1 (available from Takehara Chemical Industrial Co., Ltd.)

TABLE 2

| | | | Mortar Blending | | | | |
|---|---|---|---|---|---|---|---|
| | WATER/ | SAND/ | | UNIT AMOUNT (G) | | | |
| | POWDER | POWDER | | | POWDER (B) | | SAND (S) |
| BLENDING NO. | RATIO W/B (%) | RATIO S/B | WATER (W) | CEMENT | FLY ASH | FINE AGGREGATE | ARGILLACEOUS MATERIAL |
| (1) | 45 | 2.7 | 225 | 500 | 0 | 1350 | 0 — |
| (2) | 45 | 2.7 | 225 | 500 | 0 | 1310 | 40 ARGILLACEOUS MATERIAL |
| (3) | 45 | 2.7 | 225 | 500 | 0 | 1348 | 2 BENTONITE |
| (4) | 45 | 2.7 | 225 | 500 | 0 | 1347 | 3 KAOLINITE |
| (5) | 45 | 2.7 | 225 | 350 | 150 | 1348 | 2 BENTONITE |

W/B: A ratio (%) of the amount (g) of water to the total amount (g) of cement or cement and fly ash as powder.
S/B: A ratio of the total amount (g) of a fine aggregate or a fine aggregate and an argillaceous material as sand to the total amount (g) of cement or cement and fly ash as powder.
WATER (W): deionized water
Cement: ordinary portland cement available from TAIHEIYO CEMENT CORPORATION (specific gravity: 3.15 g/cm$^3$)
Fly ash: Fly ash II (density: 2.16 g/cm$^3$, specific surface area: 3,960 cm$^2$/g, silicon dioxide: 54.1%, moisture: less than 0.1%, ignition loss: 3.8%, 45 μm sieve residue: 5%, percent flow: 109%, activity index: 89% at 28 days, 99% at 91 days, methylene blue (MB) adsorption amount: 0.92 mg/g)
Fine aggregate: land sand (density in a saturated surface dry condition: 2.64 g/cm$^3$, fineness modulus (F.M.): 2.78), from Kimitsu in Chiba Pref.

<Fresh Mortar Test>

In accordance with JIS R5201, a fresh mortar test was carried out for a mortar having each of compositions A to E prepared according to blending Nos. (1) to (5), respectively, shown in Table 2.

Specifically, a mixing water (deionized water) prepared by adding the dispersant for hydraulic composition (each of the polycondensation products 1 to 20 or the polycondensation products 1 and 2 of Comparative Examples) in advance was added to a powder (cement, or cement and fly ash) and a sand (a fine aggregate, or a fine aggregate and an argillaceous material), and the mixture was mixed by using a high-powder mixer (manufactured by MARUTO Testing Machine Company) at low speed for 40 seconds to 60 seconds, and allowed to stand for 30 seconds. The mixing time was appropriately selected as a time in which the mortar in a flow state was confirmed after initiation of mixing (in the blends A to E, common mixing time was used). After initiation of standing, the mortar adhered to a wall of the container was scraped off for 20 seconds, and after completion of the standing, the mortar was mixed at high speed for 90 seconds to obtain a test mortar.

In order to suppress an influence of bubbles in the mortar used in the test on the flowability of the mortar, a defoaming agent (Pronal 753W available from Toho Chemical Industry Co., Ltd.) was used in an amount of 0.01% by weight relative to the total amount of cement or cement and fly ash. Thus, the air content was adjusted.

<Measurement of Mortar Flow and Calculation of Flow Retention Ratio and Flow Change Ratio>

Immediately and 30 minutes after mixing, the spreading (flow value) of the test mortar was measured by using a mini-slump cone (a cone with an upper internal diameter of 50 mm, a lower internal diameter of 100 mm, and a height of 150 mm) in accordance with JIS A1171 "Polymer cement mortar test method."

The obtained results are shown in Table 3.

The change ratios of the flow values of the test mortars of the blends A, C, and E immediately and 30 minutes after mixing were calculated as the flow retention ratio by the following expression.

Flow retention ratio (%)=[flow value 30 minutes after mixing/flow value immediately after mixing]×100

The obtained results are shown in Table 3.

For the test mortars using the same dispersant for hydraulic composition (and used amount thereof), the change ratio of the flow value of mortar (blends B to E) in which the argillaceous material or clay was added, relative to the flow value of mortar (mortar of blend A) in which the argillaceous material or clay was not added was calculated by the following expression as the flow change ratio. When the flow change ratio (%) is closer to 100%, the change of flowability due to the argillaceous material or clay contained is evaluated to be small. This is a favorable result.

Flow change ratio (%)=[flow value when argillaceous material or clay was added (blends B to E)/flow value when argillaceous material or clay was not added (blend A)]100

The obtained results are shown in Table 3.

<Measurement of Hardenability (Exothermic Peak)>

A plastic container having a diameter of 10 cm and a height of 12 cm was filled with the test mortar prepared by using the blend A, and then placed in a center of a simple insulating box made of urethane foam. The internal temperature of the mortar was measured by using Thermocouple K (diameter of wire: 0.1 mm) and NTB-201A manufactured by KYOWA ELECTRONIC INSTRUMENTS CO., LTD.

From the history of internal temperature of the mortar, the time required to reach the highest temperature (exothermic peak time (h:m)) was confirmed.

The obtained results are shown in Table 3.

<Evaluation of Appearance of Mortar Hardened Product>

A test mortar was prepared by using the blend E in the same manner as the procedure of <Fresh Mortar Test> described above, and then placed in a three-gang mold manufactured by MARUTO Testing Machine Company. After 24 hours, the test mortar was separated from the mold to obtain a mortar hardened product.

A placed surface (4 cm×16 cm) of the mortar hardened product obtained in accordance with the procedure was photographed. The placed surface (photograph) was divided into 256 grids in total, each having a length of 5 mm and a width of 5 mm. The number of grids in which darkening occurred among the 256 grids was counted, and the area ratio of darkening (the first decimal place was rounded) was calculated. The appearance (darkening) was evaluated in accordance with the following criteria.

Evaluation 1: the area ratio of darkening on the surface of the hardened product was 5.0% or more.

2: the area ratio of darkening on the surface of the hardened product was 3.0 to 4.9%.

3: the area ratio of darkening on the surface of the hardened product was 1.0 to 2.9%.

4: the area ratio of darkening on the surface of the hardened product was less than 1.0%.

The obtained results are shown in Table 3.

TABLE 3

| NO. | | ADDITION AMOUNT C × % | MIXING TIME SEC | BLEND A MORTAR FLOW (BLANK) 0 MIN | 30 MIN | RETENTION RATIO | EXO-THERMIC PEAK (H:M) | BLEND B MORTAR FLOW 0 MIN | CHANGE RATIO | BLEND C MORTAR FLOW 0 MIN | CHANGE RATIO |
|---|---|---|---|---|---|---|---|---|---|---|---|
| EXAMPLE | 1 | 0.20 | 60 | 184 | 155 | 84% | 7:29 | 175 | 95% | 155 | 84% |
| | 2 | 0.18 | 60 | 183 | 154 | 84% | 7:11 | 168 | 92% | 156 | 85% |
| | 3 | 0.22 | 60 | 182 | 153 | 84% | 7:47 | 170 | 93% | 151 | 83% |
| | 4 | 0.20 | 60 | 183 | 151 | 83% | 7:28 | 172 | 94% | 153 | 84% |
| | 5 | 0.20 | 60 | 184 | 154 | 84% | 7:31 | 170 | 92% | 152 | 83% |
| | 6 | 0.20 | 60 | 183 | 156 | 85% | 7:28 | 172 | 94% | 156 | 85% |
| | 7 | 0.20 | 60 | 181 | 161 | 89% | 7:30 | 172 | 95% | 156 | 86% |
| | 8 | 0.20 | 60 | 182 | 151 | 83% | 7:22 | 173 | 95% | 155 | 85% |
| | 9 | 0.20 | 60 | 183 | 153 | 84% | 7:26 | 170 | 93% | 154 | 84% |
| | 10 | 0.20 | 60 | 184 | 153 | 83% | 7:56 | 157 | 85% | 148 | 80% |
| | 11 | 0.20 | 60 | 182 | 154 | 85% | 7:15 | 179 | 98% | 164 | 90% |
| | 12 | 0.20 | 60 | 185 | 153 | 83% | 7:22 | 170 | 92% | 157 | 85% |
| | 13 | 0.20 | 60 | 184 | 155 | 84% | 7:26 | 179 | 97% | 158 | 86% |
| | 14 | 0.18 | 60 | 187 | 156 | 83% | 7:13 | 175 | 94% | 154 | 82% |
| | 15 | 0.20 | 60 | 184 | 173 | 94% | 7:28 | 172 | 93% | 166 | 90% |
| | 16 | 0.20 | 60 | 183 | 174 | 95% | 7:31 | 172 | 94% | 167 | 91% |
| | 17 | 0.20 | 60 | 186 | 155 | 83% | 7:25 | 176 | 95% | 155 | 83% |
| | 18 | 0.20 | 40 | 185 | 154 | 83% | 7:26 | 173 | 94% | 156 | 84% |
| | 19 | 0.20 | 60 | 185 | 156 | 84% | 7:31 | 166 | 90% | 153 | 83% |
| | 20 | 0.22 | 50 | 183 | 149 | 81% | 7:48 | 159 | 87% | 146 | 80% |
| COMPARATIVE EXAMPLE | 1 | 0.20 | 60 | 180 | 141 | 78% | 8:21 | 144 | 80% | 134 | 74% |
| | 2 | 0.20 | 60 | 184 | 140 | 76% | 8:16 | 151 | 82% | 129 | 70% |

| NO. | | BLEND C MORTAR FLOW 30 MIN | RETENTION RATIO | BLEND D MORTAR FLOW 0 MIN | CHANGE RATIO | BLEND E MORTAR FLOW 0 MIN | CHANGE RATIO | 30 MIN | RETENTION RATIO | APPEARANCE OF HARDENED PRODUCT DARKENING |
|---|---|---|---|---|---|---|---|---|---|---|
| EXAMPLE | 1 | 126 | 81% | 152 | 83% | 180 | 98% | 160 | 89% | 2 |
| | 2 | 125 | 80% | 147 | 80% | 177 | 97% | 159 | 90% | 2 |
| | 3 | 122 | 81% | 148 | 81% | 178 | 98% | 158 | 89% | 2 |
| | 4 | 121 | 79% | 147 | 80% | 176 | 96% | 156 | 89% | 2 |
| | 5 | 122 | 80% | 151 | 82% | 178 | 97% | 157 | 88% | 2 |
| | 6 | 128 | 82% | 151 | 83% | 191 | 104% | 181 | 95% | 3 |
| | 7 | 133 | 85% | 154 | 85% | 186 | 103% | 178 | 96% | 3 |
| | 8 | 124 | 80% | 150 | 82% | 202 | 111% | 191 | 95% | 3 |
| | 9 | 125 | 81% | 149 | 81% | 196 | 107% | 174 | 89% | 4 |
| | 10 | 117 | 79% | 138 | 75% | 177 | 96% | 153 | 86% | 2 |
| | 11 | 131 | 80% | 161 | 88% | 174 | 96% | 153 | 88% | 2 |
| | 12 | 124 | 79% | 153 | 83% | 189 | 102% | 171 | 90% | 3 |
| | 13 | 125 | 79% | 155 | 84% | 177 | 96% | 163 | 92% | 2 |
| | 14 | 120 | 78% | 151 | 81% | 179 | 96% | 156 | 87% | 2 |
| | 15 | 151 | 91% | 164 | 89% | 177 | 96% | 169 | 95% | 2 |
| | 16 | 154 | 92% | 163 | 89% | 178 | 97% | 175 | 98% | 2 |
| | 17 | 122 | 79% | 149 | 80% | 184 | 99% | 163 | 89% | 2 |
| | 18 | 125 | 80% | 153 | 83% | 181 | 98% | 161 | 89% | 2 |
| | 19 | 122 | 80% | 148 | 80% | 181 | 98% | 159 | 88% | 2 |
| | 20 | 112 | 77% | 141 | 77% | 177 | 97% | 155 | 88% | 2 |
| COMPARATIVE EXAMPLE | 1 | 98 | 73% | 120 | 67% | 142 | 79% | 93 | 65% | 1 |
| | 2 | 92 | 71% | 118 | 64% | 136 | 74% | 87 | 64% | 1 |

The blends A, B, C, and D were compared. In the hydraulic composition deposition containing the polycondensation product of the present invention in which the fine aggregate contains the argillaceous material (blend B), bentonite (blend C), or kaolinite (blend D), it is confirmed that the variation of mortar flow value is small and high flowability can be maintained as compared with the blend A in which the argillaceous material is not contained, as shown in Table 3.

It is confirmed that even when fly ash is used as a hydraulic powder in the composition E in which bentonite is blended, the variation of mortar flow value is small, the flow value is also maintained after 30 minutes, and the flow retention is excellent. Further, it is confirmed that darkening of appearance of the hardened product is suppressed as compared with the dispersion for hydraulic composition containing the polycondensation products in Comparative Examples.

On the other hand, in the dispersion for hydraulic composition containing the polycondensation product of Comparative Example 1 or 2 prepared by using a monomer mixture containing no compound corresponding to the compound A (alkylene oxide adduct of hydroxyethyl phenol), the mortar flow value is largely changed (decreased) due to blending of the argillaceous material or clay, and the flow value after 30 minutes is also largely decreased. In a case of using fly ash in combination, darkening clearly appears on the surface of the hardened product.

Specifically, it is confirmed that when the ratio of the compound A (alkylene oxide adduct of hydroxyethyl phenol) in the monomer mixture is increased, the variation of mortar flow value can be decreased especially when the argillaceous material (blend B) and bentonite (blend C) are blended (see Examples 10, 6, and 11).

Further, it is confirmed in the compound A that the water reduction is improved as the average number of moles of ethylene oxide added is increased, and the water reduction can be secured in the same degree even when the addition amount is decreased by 10% (see Examples 13, 1, and 14).

Moreover, it is confirmed that when a terminal OH of the compound A is converted to an anionic terminal by using a phosphate group or a sulfate group to obtain an ester derivative, the mixing time can be shortened, that is, various materials such as a cement and sand can be blended into a uniform state for a short period of time. In particular, a phosphate group is effective (see Examples 1, 18, and 20).

In the compound B (alkylene oxide adduct of phenol or a derivative thereof), it is confirmed that the water reduction is improved as the average number of moles of ethylene oxide added is increased, and the water reduction can be secured in the same degree even when the addition amount is decreased by 10% (see Examples 3, 1, and 2).

Further, it is confirmed that when two or more compounds B are used in combination, the retention is improved, and the resistance to clay (bentonite/kaolinite) is further improved (see Examples 1, 15, and 16).

In the compound C (phosphate or sulfate derivative of alkylene oxide adduct of phenol), when a benzene ring is substituted with alkyl, the flowability when blending of FA is improved, and the appearance of the hardened product is improved. It is confirmed that when a substituted alkyl group having a long chain length is used, the hardened product has a favorable appearance (Examples 1, 6, and 9).

It is confirmed that when the ratio of the compound C in the monomer mixture is increased, the flowability when blending fly ash is improved. It is confirmed that when the ratio of the compound C is adjusted, the water reduction and the retention can be adjusted (Examples 7, 6, and 8).

In conversion of a terminal of the compound C to an anionic terminal by using a phosphate, the water reduction is higher than that in a case of using a sulfate. Even when the amount of sulfate added is increased by 10%, the water reduction does not reach that in a case of using a phosphate (see Examples 18 and 20).

[Test II: Concrete Test]
<Concrete Blending>

In each of concrete blending Nos. 1 and 2 shown in Table 4, mixing water (deionized water) prepared by adding the polycondensation product (Examples 1 to 3, 6, 15, 16, and 19) and a water reducing agent in amounts shown in Tables 5 and 6 in advance was used, and fresh concrete was prepared in accordance with JIS A1138. As the water reducing agent, an AE water reducing agent (high-performance type, containing a salt of lignin sulfonic acid) commercially available product and a chemical admixture C-1 described in Examples of Japanese Patent No. 2774445 were used. A concrete containing a dispersant for hydraulic composition containing only the water reducing agent without the polycondensation products of Examples as shown in Tables 5 and 6 was used in a comparative test.

In a mixing method, a biaxial forced mixer having a nominal capacity of 100 L was used, and a concrete production capacity in each batch was set to 50 L.

A cement, fly ash, a fine aggregate, the mixing water, a coarse aggregate, and the water reducing agent were placed in the mixer, and mixed for 90 seconds in the blending No. 1, and for 120 seconds in the blending No. 2.

TABLE 4

| | | | Concrete Blending | | | | |
|---|---|---|---|---|---|---|---|
| | | | | UNIT AMOUNT (KG/M$^3$) | | | |
| | WATER | FINE | | | | | |
| NO. | CEMENT RATIO W/C (%) | AGGREGATE RATIO S/A (%) | WATER (W) | CEMENT (C) | FLY ASH (FA) | FINE AGGREGATE (S) | COARSE AGGREGATE (G) |
| 1 | 50.0 | 46.5 | 170 | 238 | 102 | 807 | 953 |
| 2 | 35.0 | 47.1 | 165 | 330 | 141 | 767 | 884 |

Water (W): tap water
Cement (C): ordinary portland cement, specific gravity: 3.16 g/cm$^3$ (available from TAIHEIYO CEMENT CORPORATION)
Fly ash (FA): Fly ash II (density: 2.16 g/cm$^3$, specific surface area: 3,960 cm$^2$/g, silicon dioxide: 54.1%, moisture: less than 0.1%, ignition loss: 3.8%, 45 μm sieve residue: 5%, percent flow: 109%, activity index: 89% at 28 days, 99% at 91 days, methylene blue (MB) adsorption amount: 0.92 mg/g)

Fine aggregate (S): land sand (specific gravity: 2.63 g/cm$^3$, F.M.: 2.78), from Kimitsu in Chiba Coarse aggregate (G): limestone (specific gravity: 2.70 g/cm$^3$, size of coarse aggregate: 5 to 20 mm), from Garou in Hokkaido <Concrete Test>

For various concretes prepared in accordance with the procedure described above, the slump, slump flow, time taken to reach 50 cm, and time taken to stop flow were measured after 0 and 30 minutes in accordance with JIS A1101 and A 1150. After the measurement of slump flow, the sample was placed in a summit mold having a diameter of 15 cm and a height of 30 cm, and was vibrated by a table vibrator for 60 seconds. The appearance of upper surface of the sample was observed. The air content was measured in accordance with JIS A1128 by using the same sample.

The setting time of the concrete was measured in accordance with JIS A 1147. The temperatures of fresh concretes used in the test were all 20±3° C.

The results of the concrete of blending No. 1 was shown in Table 5, and the results of the concrete of blending No. 2 was shown in Table 6.

TABLE 5

Results of Concrete Test (Blending No. 1)

| | POLYCONDENSATION PRODUCT | | WATER REDUCING AGENT *1 | FRESH PROPERTIES | | |
|---|---|---|---|---|---|---|
| | KIND (PREPARATION EXAMPLE NO.) | ADDITION AMOUNT (C × % *2) | ADDITION AMOUNT (C × % *2) | SLUMP (cm) | | AIR CONTENT (%) |
| | | | | 0 MINUTE | 30 MINUTES | 0 MINUTE |
| TEST EXAMPLE 1 | 1 | 0.05 | 0.40 | 17.5 | 14.5 | 5.5 |
| TEST EXAMPLE 2 | 2 | 0.05 | 0.40 | 19.0 | 14.0 | 5.5 |
| TEST EXAMPLE 3 | 3 | 0.05 | 0.40 | 17.0 | 15.0 | 5.4 |
| TEST EXAMPLE 4 | 6 | 0.05 | 0.40 | 18.0 | 15.0 | 5.7 |
| TEST EXAMPLE 5 | 15 | 0.05 | 0.40 | 18.0 | 15.5 | 5.5 |
| TEST EXAMPLE 6 | 16 | 0.05 | 0.40 | 18.5 | 16.0 | 5.4 |
| TEST EXAMPLE 7 | 19 | 0.05 | 0.40 | 18.5 | 15.5 | 5.5 |
| TEST COMPARATIVE EXAMPLE 1 | NONE | NONE | 0.80 | 18.0 | 13.0 | 5.7 |

| | FRESH PROPERTIES | | | |
|---|---|---|---|---|
| | AIR CONTENT (%) 30 MINUTES | APPEARANCE OF UPPER PORTION AFTER VIBRATION *3 | SETTING | |
| | | | START (HOUR:MINUTE) | END (HOUR:MINUTE) |
| TEST EXAMPLE 1 | 4.9 | ⊙ | 5:25 | 7:55 |
| TEST EXAMPLE 2 | 4.8 | ⊙ | 4:55 | 7:15 |
| TEST EXAMPLE 3 | 4.4 | ⊙ | 5:10 | 7:40 |
| TEST EXAMPLE 4 | 5.3 | ⊙ | 5:15 | 7:50 |
| TEST EXAMPLE 5 | 4.8 | ○ | 5:20 | 7:55 |
| TEST EXAMPLE 6 | 4.7 | ○ | 5:20 | 7:35 |
| TEST EXAMPLE 7 | 4.8 | ○ | 5:15 | 7:40 |
| TEST COMPARATIVE EXAMPLE 1 | 4.1 | X | 5:55 | 8:40 |

*1 Water reducing agent: AE water reducing agent (high-performance type, containing a salt of lignin sulfonic acid) commercially available product
*2 C × %: addition amount relative to cement amount (% by mass, in terms of solid content
*3 State: ⊙: Darkening does not occur on the upper portion of the sample. The area ratio of darkening was less than 1.0%.
○: Darkening slightly occurred on the upper portion of the sample. The area ratio of darkening was 1.0% to 5.0%.
X: Darkening occurred on the upper portion of the sample. The area ratio of darkening was 5.0% or more.

TABLE 6

Results of Concrete Test (Blending No. 2)

| | POLYCONDENSATION PRODUCT | | WATER REDUCING AGENT *1 | FRESH PROPERTIES | | |
|---|---|---|---|---|---|---|
| | KIND (PREPARATION EXAMPLE NO.) | ADDITION AMOUNT (C × % *2) | ADDITION AMOUNT (C × % *2) | ELAPSED TIME (MIN) | SLUMP FLOW (cm) | TIME TAKEN TO REACH 50 CM (SECOND) |
| TEST EXAMPLE 8 | 1 | 0.12 | 0.12 | 0 | 63.0 | 8.2 |
| | | | | 30 | 59.0 | 9.8 |

TABLE 6-continued

Results of Concrete Test (Blending No. 2)

| | | | | | | |
|---|---|---|---|---|---|---|
| TEST EXAMPLE 9 | 2 | 0.12 | 0.12 | 0 | 69.5 | 6.5 |
| | | | | 30 | 62.0 | 8.7 |
| TEST EXAMPLE 10 | 3 | 0.12 | 0.12 | 0 | 62.0 | 8.4 |
| | | | | 30 | 59.5 | 9.5 |
| TEST EXAMPLE 11 | 6 | 0.12 | 0.12 | 0 | 65.0 | 7.8 |
| | | | | 30 | 59.0 | 9.7 |
| TEST EXAMPLE 12 | 15 | 0.12 | 0.12 | 0 | 64.5 | 7.9 |
| | | | | 30 | 60.5 | 9.6 |
| TEST EXAMPLE 13 | 16 | 0.12 | 0.12 | 0 | 67.5 | 7.5 |
| | | | | 30 | 62.5 | 8.4 |
| TEST EXAMPLE 14 | 19 | 0.12 | 0.12 | 0 | 67.5 | 7.4 |
| | | | | 30 | 61.5 | 9.3 |
| TEST COMPARATIVE EXAMPLE 2 | NONE | NONE | 0.24 | 0 | 65.0 | 7.5 |
| | | | | 30 | 55.0 | 11.5 |

| | FRESH PROPERTIES | | | SETTING |
|---|---|---|---|---|
| | TERMINAL STOP (SECOND) | AIR CONTENT (%) | APPEARANCE OF UPPER PORTION AFTER VIBRATION | UPPER: START LOWER: END (HOUR:MINUTE) |
| TEST EXAMPLE 8 | 54.5 | 1.8 | ○ | 6:10 |
| | 42.5 | 1.6 | ○ | 8:10 |
| TEST EXAMPLE 9 | 58.0 | 1.7 | ○ | 5:40 |
| | 47.0 | 1.7 | ○ | 7:40 |
| TEST EXAMPLE 10 | 52.0 | 1.6 | ○ | 6:20 |
| | 43.5 | 1.4 | ○ | 8:25 |
| TEST EXAMPLE 11 | 56.0 | 1.8 | ⊙ | 6:15 |
| | 41.5 | 1.6 | ⊙ | 8:10 |
| TEST EXAMPLE 12 | 55.5 | 1.6 | ○ | 6:25 |
| | 44.0 | 1.5 | ○ | 8:15 |
| TEST EXAMPLE 13 | 57.0 | 1.6 | ○ | 5:55 |
| | 46.5 | 1.5 | ○ | 8:05 |
| TEST EXAMPLE 14 | 56.5 | 1.7 | ○ | 5:50 |
| | 45.0 | 1.5 | ○ | 7:50 |
| TEST COMPARATIVE EXAMPLE 2 | 63.0 | 2.0 | X | 6:50 |
| | 56.0 | 2.4 | X | 9:00 |

*1 Water reducing agent: admixture C-1 described in Examples of Japanese Patent No. 2774445
*2 C × %: addition amount relative to cement amount (% by mass, in terms of solid content)
*3 State: ⊙: Darkening does not occur on the upper portion of the sample. The area ratio of darkening was less than 1.0%.
○: Darkening slightly occurred on the upper portion of the sample. The area ratio of darkening was 1.0% to 5.0%.
X: Darkening occurred on the upper portion of the sample. The area ratio of darkening was 5.0% or more.

Among the concretes of blending Nos. 1 and 2, the concretes of Test Examples 1 to 7 and 8 to 14 in which the dispersant for hydraulic composition of the present invention ((polycondensation products 1 to 3, 6, 15, 16, and 19) and the water reducing agent) are contained have higher temporal stability, lower concrete viscosity, and lower setting retardation, than those of the concretes of Comparative Examples 1 and 2 in which only the water reducing agent is contained, as shown in Tables 5 and 6. Thus, these concretes have favorable stability. Even when the dispersant for hydraulic composition is blended in a concrete composition blended with fly ash (FA), high water reduction can be maintained. In particular, in a hardened product of the FA-blended composition, the occurrence of darkening on a surface of the concrete that is caused by bringing an unburned carbon to the surface can be suppressed. Thus, a hardened product having excellent appearance can be provided.

The invention claimed is:
1. A polycondensation product containing a copolymer obtained by polycondensation of a monomer mixture containing a compound A of the following Formula (A), a compound B of the following Formula (B), a compound C of the following Formula (C), and one or more aldehyde compounds D of the following Formula (D):

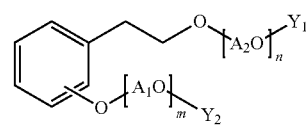  (A)

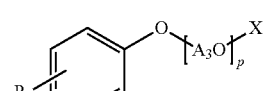  (B)

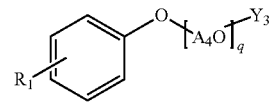  (C)

$R_2$—CHO, HO($CH_2O$)$_r$H or ($CH_2O$)$_3$  (D)

(wherein $A_1O$ and $A_2O$ are each independently a $C_{2-4}$ alkylene oxide group;

m and n are an average number of moles of alkylene oxide added, and are each independently a number of 0 to 300, and m+n is 1 or more;

$A_3O$ is a $C_{2-4}$ alkylene oxide group;

p is an average number of moles of alkylene oxide added, and is a number of 1 to 300;

X is a hydrogen atom, a $C_{1-10}$ alkyl group, or a $C_{2-24}$ acyl group;

$A_4O$ is a $C_{2-4}$ alkylene oxide group;

q is an average number of moles of alkylene oxide added, and is a number of 1 to 300;

$R_0$ is a hydrogen atom, a $C_{1-24}$ alkyl group, or a $C_{2-24}$ alkenyl group;

$R_1$ is a hydrogen atom, a $C_{1-24}$ alkyl group, or a $C_{2-24}$ alkenyl group;

$Y_1$ and $Y_2$ are each independently a hydrogen atom, a phosphate group, or a sulfate group;

$Y_3$ is a phosphate group or a sulfate group;

$R_2$ is a hydrogen atom, a carboxyl group, a $C_{1-10}$ alkyl group, a $C_{2-10}$ alkenyl group, a phenyl group, a naphthyl group, or a heterocyclic group; and r is a number of 1 to 100).

2. The polycondensation product according to claim 1, wherein the monomer mixture contains the compounds A to D at a ratio by mole of the compounds A, B, and C, compound A:compound B:compound C, of 0.1 to 2:0.1 to 2:0.1 to 4, and at a ratio by mole of the compound D to the total amount by mole of the compounds A, B, and C, (compound A+compound B+compound C):compound D, of 1 to 10:10 to 1.

3. The polycondensation product according to claim 2, wherein the monomer mixture contains two or more compounds B of Formula (B).

4. The polycondensation product according to claim 3, wherein the monomer mixture contains two or more compounds C of Formula (C).

5. A dispersant for hydraulic composition containing the polycondensation product or copolymer according to claim 4.

6. A dispersant for hydraulic composition containing the polycondensation product or copolymer according to claim 3.

7. The polycondensation product according to claim 2, wherein the monomer mixture contains two or more compounds C of Formula (C).

8. A dispersant for hydraulic composition containing the polycondensation product or copolymer according to claim 7.

9. A dispersant for hydraulic composition containing the polycondensation product or copolymer according to claim 2.

10. The polycondensation product according to claim 1, wherein the monomer mixture contains two or more compounds B of Formula (B).

11. The polycondensation product according to claim 10, wherein the monomer mixture contains two or more compounds C of Formula (C).

12. A dispersant for hydraulic composition containing the polycondensation product or copolymer according to claim 11.

13. A dispersant for hydraulic composition containing the polycondensation product or copolymer according to claim 10.

14. The polycondensation product according to claim 1, wherein the monomer mixture contains two or more compounds C of Formula (C).

15. A dispersant for hydraulic composition containing the polycondensation product or copolymer according to claim 14.

16. A dispersant for hydraulic composition containing the polycondensation product or copolymer according to claim 1.

17. A copolymer obtained by polycondensation of a monomer mixture containing the compound A of Formula (A), the compound B of Formula (B), the compound C of Formula (C), and one or more aldehyde compounds D of Formula (D) according to claim 1.

* * * * *